(12) United States Patent
Boyce

(10) Patent No.: US 7,466,774 B2
(45) Date of Patent: Dec. 16, 2008

(54) MIXED INTER/INTRA VIDEO CODING OF MACROBLOCK PARTITIONS

(75) Inventor: Jill MacDonald Boyce, Manalapan, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 728 days.

(21) Appl. No.: 10/541,603

(22) PCT Filed: Jan. 6, 2004

(86) PCT No.: PCT/US2004/000074

§ 371 (c)(1),
(2), (4) Date: Jul. 7, 2005

(87) PCT Pub. No.: WO2004/064255

PCT Pub. Date: Jul. 29, 2004

(65) Prior Publication Data

US 2006/0153297 A1    Jul. 13, 2006

Related U.S. Application Data

(60) Provisional application No. 60/438,427, filed on Jan. 7, 2003.

(51) Int. Cl.
*H03D 1/00* (2006.01)
*H04L 27/06* (2006.01)

(52) U.S. Cl. .................................. 375/342; 375/240.13

(58) Field of Classification Search ................................. 375/240.01–240.29
See application file for complete search history.

(56) References Cited

U.S. PATENT DOCUMENTS

| | | | |
|---|---|---|---|
| 6,005,981 A | 12/1999 | Ng et al. | |
| 6,078,617 A * | 6/2000 | Nakagawa et al. | 375/240 |
| 6,404,814 B1 | 6/2002 | Apostolopoulos et al. | |
| 6,542,549 B1 | 4/2003 | Tan et al. | |
| 2002/0110195 A1 | 8/2002 | Auvray et al. | |

OTHER PUBLICATIONS

Wiegand, JVT Study of Final Committee Draft, Dec. 5-13, 2002, ftp://ftp.imtc-files.org/jvt-experts/2002 12 Awaji/JVT-F100d1ncm.zip.
Schwarz and Wiegand, VCEG-O17, Dec. 4-6, 2001, ftp://standard.pictel.com/video-site/0112-Pat//VCEG-O17.doc.
Search Report Dated Jul. 13, 2004.

* cited by examiner

*Primary Examiner*—Curtis B Odom
(74) *Attorney, Agent, or Firm*—Joseph J. Laks; Paul P. Kiel; Guy H. Eriksen

(57) ABSTRACT

A video encoder and corresponding method are provided for mixed inter/intra encoding of a macroblock having a plurality of partitions, where the encoder includes a reference picture weighting applicator coupled with a reference picture weighting factor unit for assigning weighting factors corresponding to each of the inter and intra coded partitions, respectively; and the corresponding method for encoding a macroblock with several partitions includes inter-coding at least one partition and intra-coding at least a second partition.

23 Claims, 3 Drawing Sheets

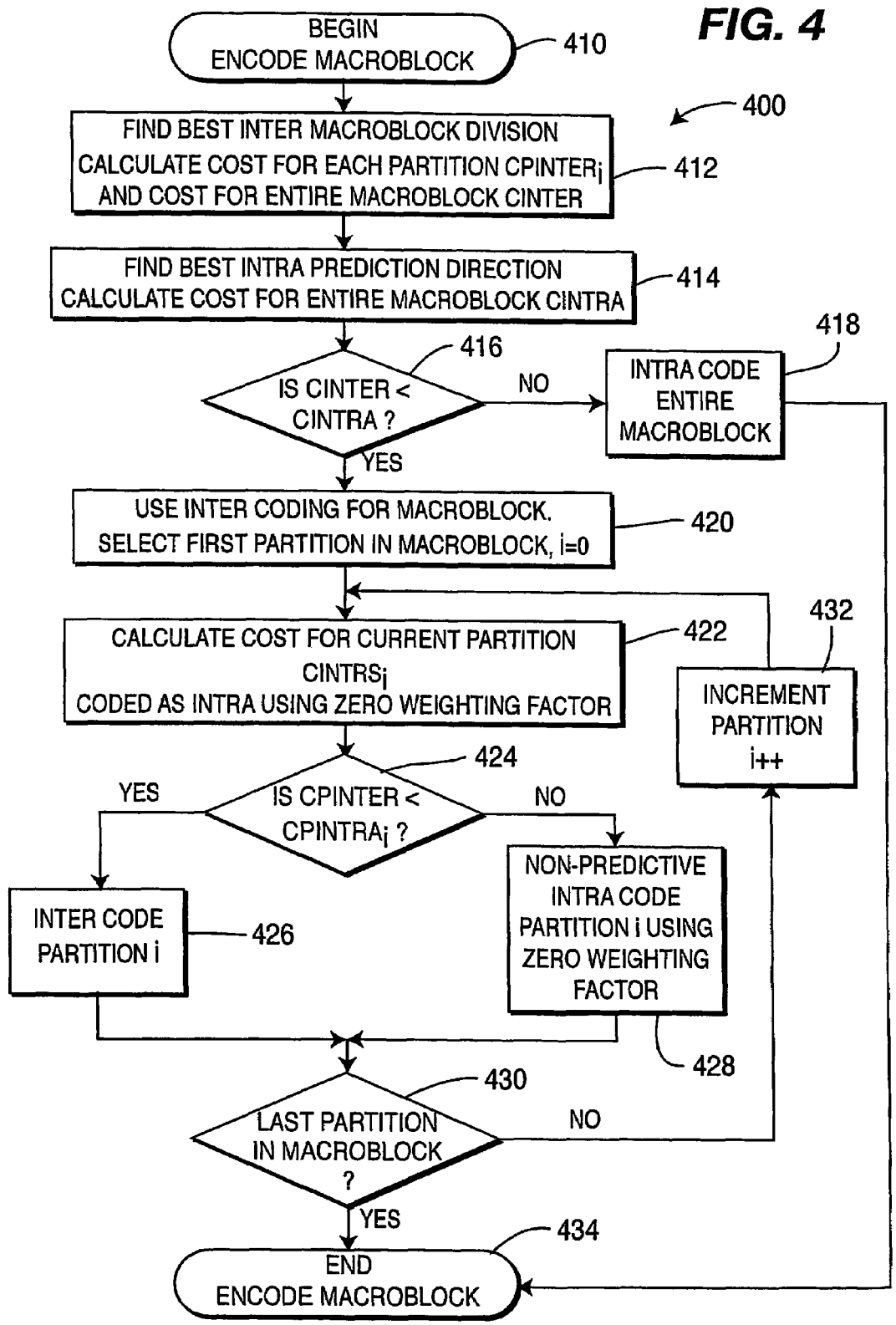

MIXED INTER/INTRA VIDEO CODING OF MACROBLOCK PARTITIONS

CROSS-REFERENCE TO RELATED APPLICATION

This application claims the benefit, under 35 U.S.C. § 365 of International Application PCT/US04/00074, filed Jan. 6, 2004, which was published in accordance with PCT Article 21(2) on Jul. 29, 2004 in English and which claims the benefit of U.S. provisional patent application No. 60/438,427, filed Jan. 7, 2003.

FIELD OF THE INVENTION

The present invention is directed towards video encoders, and more particularly, towards an apparatus and method for encoding mixed interblock and intrablock video.

BACKGROUND OF THE INVENTION

Video data is generally processed and transferred in the form of bit streams. Typical video compression encoders gain much of their compression efficiency by forming a reference picture prediction of a picture or macroblock to be encoded, and encoding the difference between the current picture and the prediction. The more closely that the prediction is correlated with the current picture, the fewer the number of bits that are needed to compress that picture, thereby increasing the efficiency of the process. Thus, it is desirable for the best possible reference picture prediction to be formed.

Interblock ("inter") and intrablock ("intra") coding are commonly used in video compression standards. Generally, an encoder makes an inter/intra coding decision for each macroblock based on coding efficiency and subjective quality considerations. Some partitions (e.g., 16×8, 8×16 or 8×8 sub-blocks) of a 16×16 macroblock, for example, might be more efficiently coded using intra coding while other partitions of the same macroblock might be more efficiently coded using inter coding.

Thus, each individual macroblock was either coded as Intra, i.e., using only spatial correlation, or coded as Inter, i.e., using temporal correlation from previously coded frames. Inter coding is typically used for macroblocks that are well predicted from previous frames, and intra coding is generally used for macroblocks that are not well predicted from previous frames, or for macroblocks with low spatial activity.

The JVT video compression standard, which is also known as H.264 and MPEG AVC, uses tree-structured hierarchical macroblock partitions. Inter-coded 16×16 pixel macroblocks may be broken into macroblock partitions, of sizes 16×8, 8×16, or 8×8. 8×8 macroblock partitions are also known as sub-macroblocks. Sub-macroblocks may also be broken into sub-macroblock partitions, of sizes 8×4, 4×8, and 4×4. An encoder may select how to divide the macroblock into partitions and sub-macroblock partitions based on the characteristics of a particular macroblock in order to maximize compression efficiency and subjective quality.

Multiple reference pictures may be used for Inter prediction, with a reference picture index coded to indicate which of the multiple reference pictures is used. In P pictures (or P slices), only single directional prediction is used, and the allowable reference pictures are managed in list 0. In B pictures (or B slices), two lists of reference pictures are managed, list 0 and list 1. In B pictures (or B slices), single directional prediction using either list 0 or list 1 is allowed, or bi-prediction using both list 0 and list 1 is allowed. When bi-prediction is used, the list 0 and the list 1 predictors are averaged together to form a final predictor.

Each macroblock partition may have independent reference picture indices, prediction type (e.g., list 0, list 1, bi-prediction), and an independent motion vector. Each sub-macroblock partition may have independent motion vectors, but all sub-macroblock partitions in the same sub-macroblock use the same reference picture index and prediction type.

It was proposed that intra prediction could be used for some of the partitions of an inter-coded macroblock. Because of complexity concerns, ultimately this flexibility was disallowed, and intra-coding mode is not allowed for individual macroblock partitions under the current standards. Some of the increased complexity in supporting both inter and intra coded partitions inside the same macroblock is due to the intra spatial directional prediction used in the JVT standard. Disallowing mixed inter/intra coding inside the same macroblock can hurt coding efficiency and especially subjective quality. For some blocks in an image, intra coding is more efficient than intra coding.

The Main and Extended profiles of the JVT standard provide a tool for weighted prediction. When weighted prediction is in use, a weighting factor and an offset are applied to inter predictions. For single directional prediction, the weighted predictor is formed as:

$$SampleP = Clip1(((SampleP0 \cdot W_0 + 2^{LWD-1}) >> LWD) + O_0);$$

and for bi-directional prediction, the weighted predictor is formed as:

$$SampleP = Clip1((SampleP0 \cdot W_0 + SampleP1 \cdot W_1 + 2^{LWD}) >> (LWD+1) + (O_0 + O_1 + 1) >> 1);$$

where $W_0$ and $O_0$ are the list 0 reference picture weighting factor and offset, respectively, and $W_1$ and $O_1$ are the list 1 reference picture weighting factor and offset, and LWD is the log weight denominator-rounding factor. $SampleP_0$ and $SampleP_1$ are the list 0 and list 1 initial predictors, and SampleP is the weighted predictor. Weighting factors and offsets are optionally coded in the slice header and are associated with particular reference picture indices.

The relevant syntax elements in the JVT standard are:

luma_log_weight_denom, chroma_log_weight_denom, luma_weight_l0, chroma_weight_l0, luma_offset_l0, chroma_offset_l0, luma_weight_l1, chroma_weight_l1, luma_offset_l1, and chroma_offset_l1.

In addition, more than one reference picture index can be associated with a particular reference picture store by using reference picture reordering, which allows more than one weighting factor to be used while predicting from the same reference picture store.

The Joint Video Team ("JVT") video compression standard explicitly supports 16×16 pixel macroblocks being divided into smaller sized macroblock partitions for inter coding, but does not support inter coding of some partitions of a macroblock and intra coding of other partitions of the same macroblock.

SUMMARY OF THE INVENTION

These and other drawbacks and disadvantages of the prior art are addressed by an apparatus and method that provide mixed inter/intra coding of macroblocks through the use of weighted prediction.

A video encoder and corresponding method are provided for mixed inter/intra encoding of a macroblock having a plurality of partitions, where the encoder includes a reference picture weighting applicator coupled with a reference picture weighting factor unit for assigning weighting factors corresponding to each of the inter and intra coded partitions, respectively; and the corresponding method for encoding a macroblock with several partitions includes inter-coding at least one partition and intra-coding at least a second partition.

Exemplary embodiments of the present invention are capable of providing mixed inter/intra coding in compliance with the JVT compression standard through the use of weighted prediction. In accordance with the principles of the invention, mixed inter/intra coding of partitions within the same macroblock is allowed, which can improve coding efficiency as well as subjective video quality.

These and other aspects, features and advantages of the present invention will become apparent from the following description of exemplary embodiments, which is to be read in connection with the accompanying drawings.

BRIEF DESCRIPTION OF THE DRAWINGS

The present invention may be better understood in accordance with the following exemplary figures, in which:

FIG. 4 shows a flow diagram for a method of encoding macroblocks in accordance with the principles of the present invention.

DETAILED DESCRIPTION OF PREFERRED EMBODIMENTS

Figure 1:
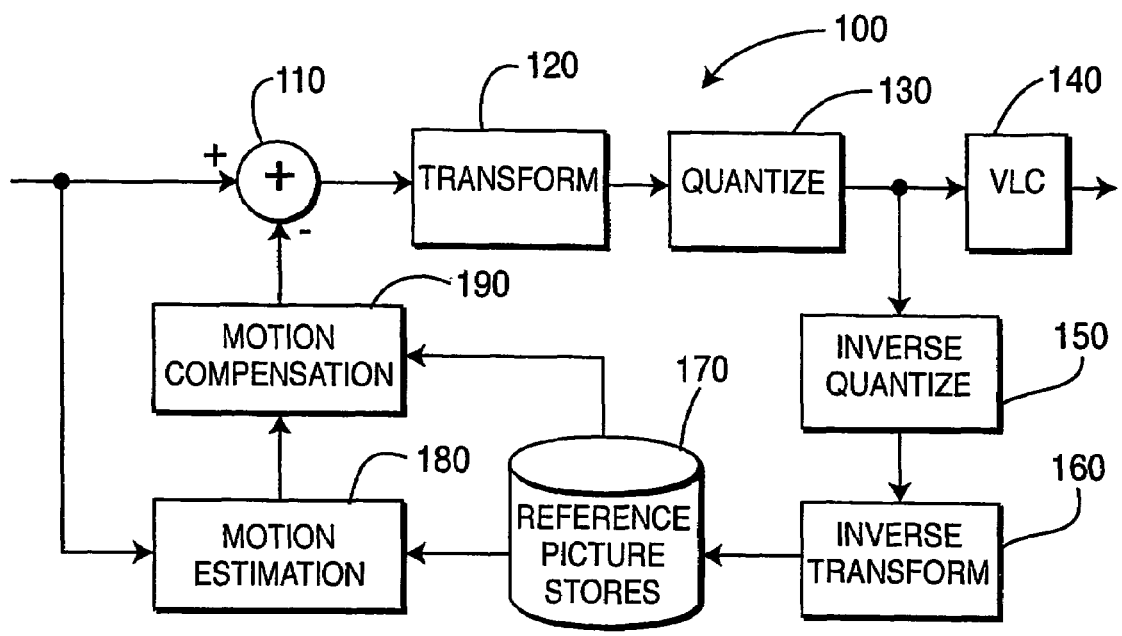
FIG. 1 shows a block diagram for a standard video encoder.

The Joint Video Team ("JVT") video compression standard supports division of 16×16 pixel macroblocks into smaller sized macroblock partitions for inter coding, but does not allow inter coding of some partitions of a macroblock and intra coding of other partitions of the same macroblock. In embodiments of the present invention, mixed inter/intra coding can be accomplished using the JVT compression standard, using weighted prediction.

The instant description illustrates the principles and various embodiments of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means that can provide those functionalities as equivalent to those shown herein.

As shown in FIG. 1, a standard video encoder is indicated generally by the reference numeral 100. An input to the encoder 100 is connected in signal communication with a non-inverting input of a summing junction 110. The output of the summing junction 110 is connected in signal communication with a block transform function 120. The transformer 120 is connected in signal communication with a quantizer 130. The output of the quantizer 130 is connected in signal communication with a variable length coder ("VLC") 140, where the output of the VLC 140 is an externally available output of the encoder 100.

The output of the quantizer 130 is further connected in signal communication with an inverse quantizer 150. The inverse quantizer 150 is connected in signal communication with an inverse block transformer 160, which, in turn, is connected in signal communication with a reference picture store 170. A first output of the reference picture store 170 is connected in signal communication with a first input of a motion estimator 180. The input to the encoder 100 is further connected in signal communication with a second input of the motion estimator 180. The output of the motion estimator 180 is connected in signal communication with a first input of a motion compensator 190. A second output of the reference picture store 170 is connected in signal communication with a second input of the motion compensator 190. The output of the motion compensator 190 is connected in signal communication with an inverting input of the summing junction 110.

Figure 2:
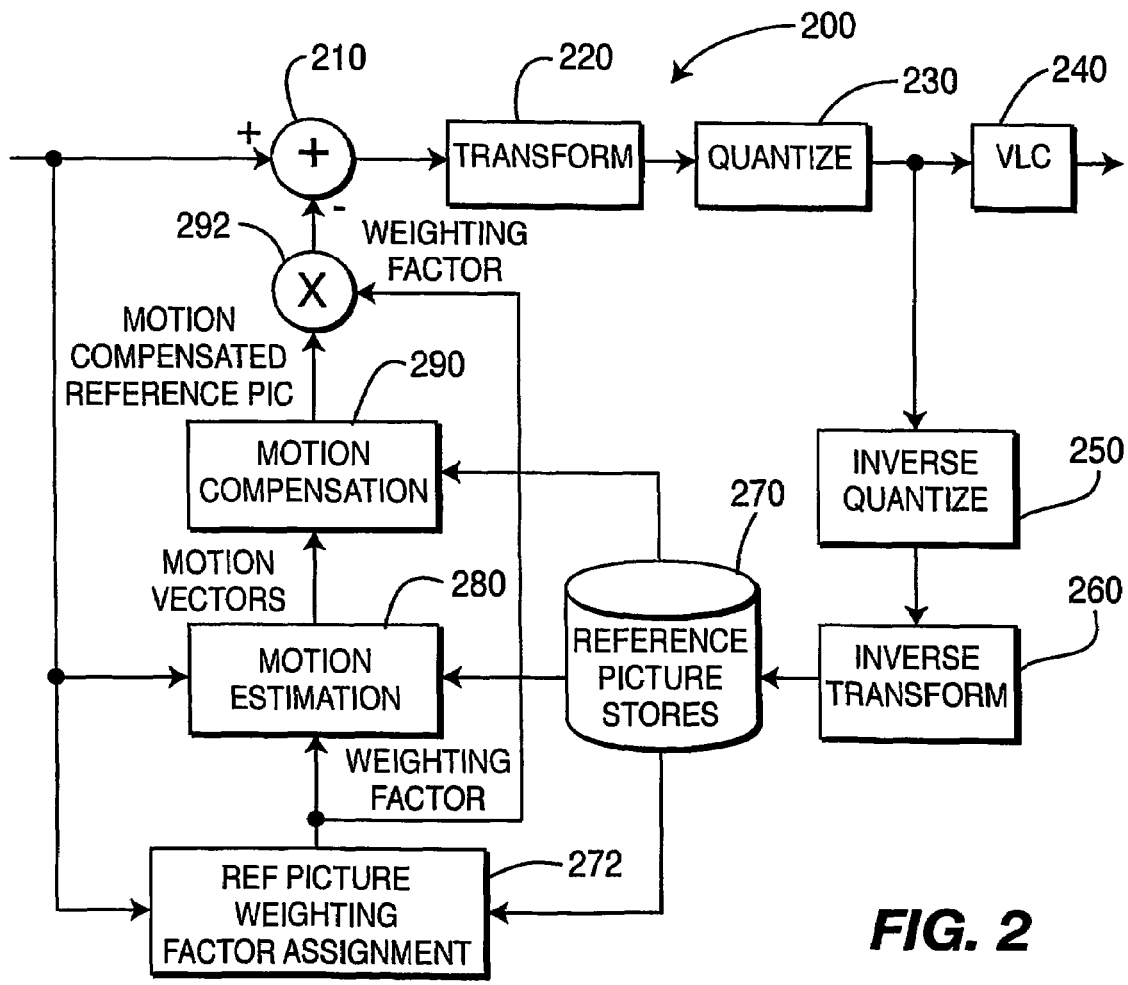
FIG. 2 shows a block diagram for a video encoder with reference picture weighting.

Turning to FIG. 2, a video encoder with reference picture weighting is indicated generally by the reference numeral 200. An input to the encoder 200 is connected in signal communication with a non-inverting input of a summing junction 210. The output of the summing junction 210 is connected in signal communication with a block transformer 220. The transformer 220 is connected in signal communication with a quantizer 230. The output of the quantizer 230 is connected in signal communication with a VLC 240, where the output of the VLC 440 is an externally available output of the encoder 200.

The output of the quantizer 230 is further connected in signal communication with an inverse quantizer 250. The inverse quantizer 250 is connected in signal communication with an inverse block transformer 260, which, in turn, is connected in signal communication with a reference picture store 270. A first output of the reference picture store 270 is connected in signal communication with a first input of a reference picture weighting factor assignor 272. The input to the encoder 200 is further connected in signal communication with a second input of the reference picture weighting factor assignor 272. The output of the reference picture weighting factor assignor 272, which is indicative of a weighting factor, is connected in signal communication with a first input of a motion estimator 280. A second output of the reference picture store 270 is connected in signal communication with a second input of the motion estimator 280.

The input to the encoder 200 is further connected in signal communication with a third input of the motion estimator 280. The output of the motion estimator 280, which is indicative of motion vectors, is connected in signal communication with a first input of a motion compensator 290. A third output of the reference picture store 270 is connected in signal communication with a second input of the motion compensator 290. The output of the motion compensator 290, which is indicative of a motion compensated reference picture, is connected in signal communication with a first input of a multiplier 292. The output of the reference picture weighting factor assignor 272, which is indicative of a weighting factor, is connected in signal communication with a second input of the multiplier 292. The output of the multiplier 292 is connected in signal communication with an inverting input of the summing junction 210.

In U.S. patent application Ser. No. 10/410,481, filed Apr. 9, 2003, having a common assignee, and entitled "ADAPTIVE WEIGHTING OF REFERENCE PICTURES IN VIDEO DECODING"; and in U.S. patent application Ser. No. 10/410,456, also filed Apr. 9, 2003 and also having a common assignee, and entitled "ADAPTIVE WEIGHTING OF REFERENCE PICTURES IN VIDEO ENCODING", both of which are incorporated herein by reference in their entireties; an apparatus and method are disclosed which utilize a set of weighting factors transmitted once per picture or slice, with a particular weighting factor associated with each reference picture index.

Figure 3:
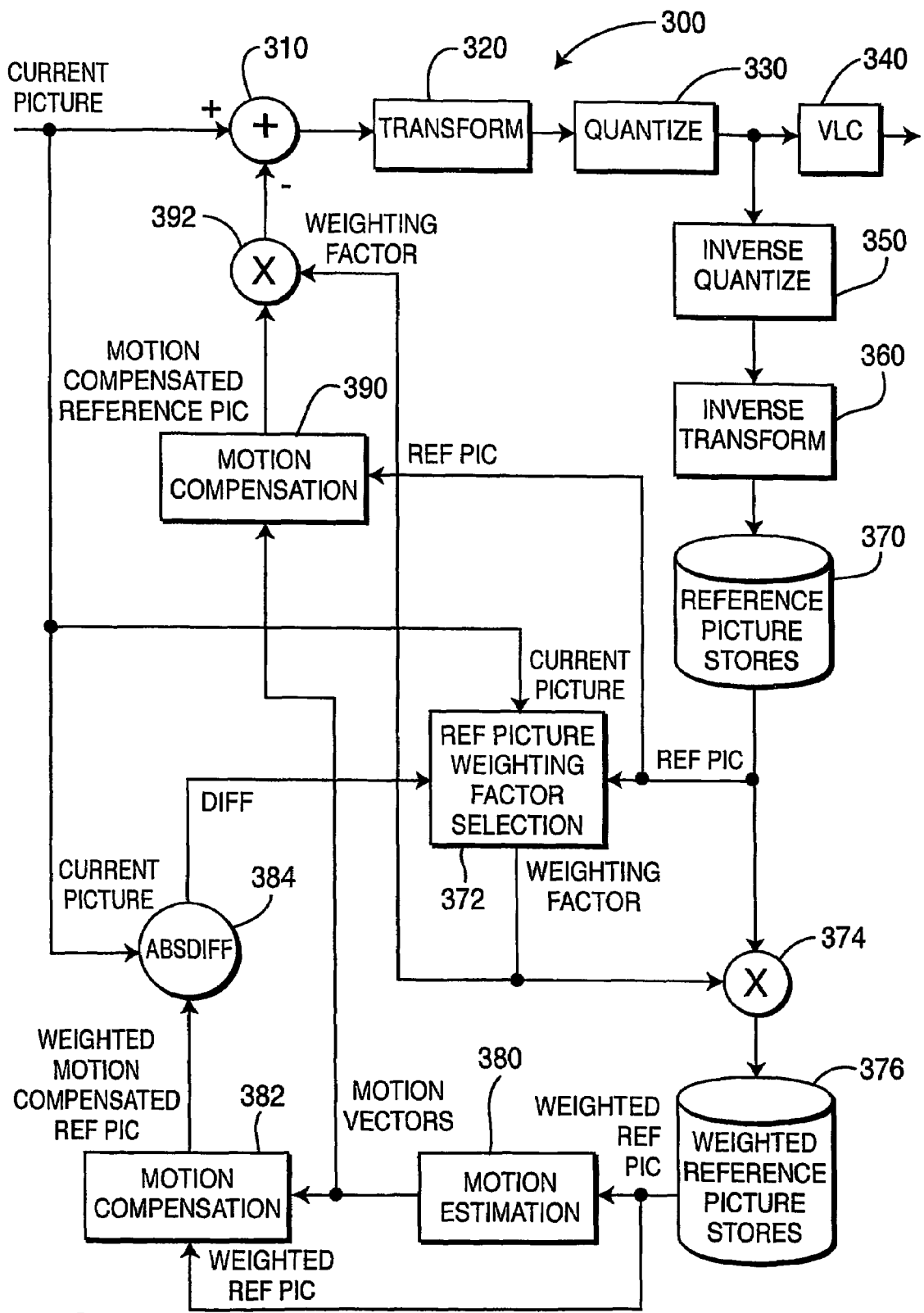
FIG. 3 shows a block diagram for a video encoder with integrated motion estimation and weighting prediction.

Turning now to FIG. 3, a video encoder with integrated motion estimation and weighting prediction is indicated generally by the reference numeral 300. An input to the encoder 300 is connected in signal communication with a non-inverting input of a summing junction 310. The output of the summing junction 310 is connected in signal communication with a block transformer 320. The transformer 320 is connected in signal communication with a quantizer 330. The output of the quantizer 330 is connected in signal communication with a VLC 340, where the output of the VLC 340 is an externally available output of the encoder 300.

The output of the quantizer 330 is further connected in signal communication with an inverse quantizer 350. The inverse quantizer 350 is connected in signal communication with an inverse block transformer 360, which, in turn, is connected in signal communication with a reference picture store 370. A first output of the reference picture store 370 is connected in signal communication with a first input of a reference picture weighting factor selector 372. The input to the encoder 300 is further connected in signal communication with a second input of the reference picture weighting factor selector 372 to provide the current picture to the selector. The output of the reference picture weighting factor selector 372, which is indicative of a weighting factor, is connected in signal communication with a first input of a multiplier 374. A second input of the multiplier 374 is connected in signal communication with the reference picture output of the reference picture store 370. It should be noted that although shown simply as a multiplier 374, other types of weighting factor applicators may be constructed other than a multiplier, as would be apparent to those of ordinary skill in the art.

The output of the multiplier 374 is connected in signal communication with a weighted reference picture store 376. The output of the weighted reference picture store 376 is connected in signal communication with a first input of a motion estimator 380 for providing a weighted reference picture. The output of the motion estimator 380 is connected in signal communication with a first motion compensator 382 for providing motion vectors. The output of the motion estimator 380 is further connected in signal communication with a first input of a second motion compensator 390. A second output of the weighted reference picture store 376 is connected in signal communication with a second input of the first motion compensator 382.

The output of the first motion compensator 382, which is indicative of a weighted motion compensated reference picture, is connected in signal communication with a first input of an absolute difference generator 384. The input to the encoder 300, which is the current picture, is further connected in signal communication with a second input of the absolute difference generator 384. The output of the absolute difference function 384 is connected in signal communication with a third input of the reference picture weighting factor selector 372.

A third output of the reference picture store 370 is connected in signal communication with a second input of the second motion compensator 390. The output of the second motion compensator 390, which is indicative of a motion compensated reference picture, is connected in signal communication with a first input of a multiplier 392. The output of the reference picture weighting factor selector 372, which is indicative of a weighting factor, is connected in signal communication with a second input of the multiplier 392. The output of the multiplier 392 is connected in signal communication with an inverting input of the summing junction 310.

In U.S. patent application Ser. No. 10/410,479, filed Apr. 9, 2003 and having a common assignee, and entitled "MOTION ESTIMATION WITH WEIGHTING PREDICTION", and which is incorporated herein by reference in its entirety; an apparatus and method are disclosed for combining the weighting factor search with the motion estimation search, resulting in a higher number of computations performed for finding the weighting factor with motion estimation than for performing estimation alone in the absence of reference picture weighting.

As shown in FIG. 4, a flow diagram for a method of encoding macroblocks is indicated generally by the reference numeral 400. Here, a begin block 410 passes control to a function block 412, which finds the best Inter macroblock division, calculates the cost for each partition, CPINTER; and calculates the cost for the entire macroblock, CINTER. The block 412 passes control to a function block 414, which finds the best Intra prediction direction and calculates the cost for the entire macroblock, CINTRA. The block 414 passes control to a decision block 416, which determines whether CINTER is less than CINTRA.

If CINTER is not less than CINTRA, control passes to a function block 418 that Intra codes the entire macroblock, and then passes control to an end block 434. If, on the other hand, CINTER is less than CINTRA, control passes to a function block 420, which uses Inter coding for the macroblock and selects the first (i=0) partition of the macroblock. The block 420 passes control to a function block 422, which calculates the cost for the current partition, CPINTRA$_i$, which is coded as Intra using a zero weighting factor. The block 422, in turn, passes control to a decision block 424, which determines whether CPINTER$_i$ is less than CPINTRA$_i$.

If CPINTER$_i$ is less than CPINTRA$_i$, control passes to a function block 426, which Inter codes the current partition i, and passes control to a decision block 430. If, on the other hand, CPINTER$_i$ is not less than CPINTRA$_i$, control passes to a function block 428, which non-predictively Intra codes the partition i using a zero weighting factor, and passes control to the decision block 430.

The decision block 430, in turn, determines whether the current partition i is the last partition in the macroblock. If the current partition i is not the last partition in the macroblock, control passes to a function block 432, which increments the current partition i, and passes control back to the function block 422. If, on the other hand, the current partition i is the last partition in the macroblock, then control passes to the end block 434.

Thus, in operation of the present invention, mixed inter/intra coding of partitions of the same macroblock can be accomplished using the JVT compression standard. Intra coding of a macroblock partition is accomplished by using a weighting factor of zero with the weighted prediction tool in the Main and Extended profiles of the JVT standard. This type of intra coding is referred to as non-predictive intra coding, to differentiate it from the spatial directional intra coding used when entire macroblocks are intra coded. A macroblock containing some non-predictive intra coded partitions is still considered to be an inter coded macroblock.

A weighting factor of zero is coded in the slice header, associated with a particular reference picture index. The encoder may associate multiple reference picture indices with a particular reference picture store, using reference picture reordering, in order to allow both a zero and a non-zero weighting factor to be associated with a particular reference picture store. Or the encoder may choose to use the default reference picture ordering, without using reference picture reordering, and to associate only a zero weighting factor with a particular reference picture store. If only a zero weighting factor is associated with a given reference picture store, it can not be used for inter prediction, so the encoder will select to do this when it is determined that this reference picture store would not be frequently selected for inter prediction. A long-term reference picture can be associated with a zero weighting factor for this purpose.

For the single directional prediction case, with a weighting factor of zero, the weighted prediction formula for calculating the inter prediction:

SampleP=Clip1(((SampleP0·$W_0$+$2^{LWD-1}$)>>LWD)+ $O_0$)

becomes:

SampleP=$O_0$

The offset value $O_0$ may be set to be equal to zero, or to 128, or to any other desired value. MPEG-1 and MPEG-2 effectively use an offset of 128 for intra coding.

With a sample prediction of zero or of $O_0$ for all pixels of a macroblock partition, the macroblock partition is effectively intra coded, but spatial directional prediction is not performed. The partition is referred to as being non-predictive intra coded.

In B pictures (or B slices), non-predictive intra coding for a macroblock partition can be accomplished either by selecting only List 0 or List 1 prediction and the reference picture index which was associated with a zero weighting factor. Alternatively, bi-prediction could be used, with a zero weighting factor sent in the slice header for a particular index for list 0 and for another index for list 1, and non-predictive intra coding could be accomplished for that macroblock partition by coding using bi-prediction with the appropriate zero weighting factor associated reference picture indices for list 0 and list 1.

In a preferred embodiment of the present invention, a JVT video encoder encodes the macroblocks of a picture. When encoding a given macroblock, in addition to determining how to divide a macroblock into partitions and sub-macroblock partitions, the encoder determines whether is it is more advantageous for each macroblock partition to be coded as non-predictive intra or as inter (e.g., list 0, list 1, direct, or bi-predictive). For those macroblock partitions(s) which are to be coded as non-predictive intra, an inter coding mode (e.g., list 0, list 1, direct, or bi-predictive) is used in the mb_type for that partition, with reference picture indices used that are associated with a zero weighting factor. Non-predictive intra coded partitions are not further divided in sub-macroblock partitions, as is generally allowed for 8×8 sub-macroblock partitions, as additional bits would be required to indicate the division into sub-macroblock partitions, with no benefit. The differential motion vector for the non-predictive intra coded partition is set to zero, because that will use the fewest number of bits to code, and all possible values of the motion vector will yield the same decoded pixels.

Using this method, intra coding is effectively accomplished for some but not all of the partitions of a macroblock, which is compatible with the JVT compression standard. No intra spatial directional prediction is performed for non-predictive intra coded partitions.

An exemplary method for encoding a macroblock in accordance with the proposed invention is shown in the flowchart 400 described with respect to FIG. 4. The best division of the macroblock into macroblock partitions and sub-macroblock partitions for Inter coding of the macroblock is determined using rate-distortion optimization, and a cost measure is calculated for each partition, CPINTER$_i$, and for the entire macroblock, CINTER. The cost for coding the partition includes the cost of coding the reference picture index, the motion vector, and the prediction residual. Then the best Intra spatial prediction direction for the Intra coding of the macroblock is determined and a cost measure is calculated for Intra coding of the entire macroblock, CINTRA. Then if CINTER is not less than CINTRA, the entire macroblock is coded as Intra, using spatial directional prediction. Otherwise, the macroblock is coded as an inter macroblock.

Next, each partition of the inter macroblock is considered to be coded as inter or non-predictive intra. The cost for intra coding the partition, using zero weighted prediction is computed, $CPINTRA_i$, considering the cost of coding the reference picture index, and the residual, and the zero valued differential motion vector cost.

If for the partition i $CPINTER_i$ is less than $CPINTRA_i$, the partition i will be inter coded normally, and may be further divided into sub-macroblock partitions. Otherwise, the partition will be non-predictive intra coded, by selecting the reference picture index associated with a zero weighting factor.

These and other features and advantages of the present invention may be readily ascertained by one of ordinary skill in the pertinent art based on the teachings herein. It is to be understood that the principles of the present invention may be implemented in various forms of hardware, software, firmware, special purpose processors, or combinations thereof.

Most preferably, the principles of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. A method for encoding a macroblock having a plurality of partitions, the method comprising:
   inter-coding at least one of said plurality of partitions; and
   intra-coding at least a second of said plurality of partitions wherein said intra-coding comprises providing a reference picture index that is associated with a weighting factor of zero.

2. A method as defined in claim 1 wherein said macroblock comprises video data in compliance with the Joint Video Team ("JVT") standard.

3. A method as defined in claim 1 wherein said macroblock comprises a non-intra macroblock type.

4. A method as defined in claim 1 wherein said intra-coding comprises non-predictive intra-coding performed within a weighted prediction encoding mode by using a weighting factor of zero with a weighted prediction tool from at least one of the Main and Extended profiles of the JVT standard.

5. A method as defined in claim 4, further comprising coding a zero differential motion vector for a partition that is non-predictively intra-coded.

6. A method as defined in claim 1 wherein the inter-coded at least one of said plurality of partitions has a reference picture index associated with a non-zero valued weighting factor.

7. A method as defined in claim 6, further comprising deciding between inter-coding and non-predictive intra-coding of a partition in response to a measure of cost for each coding method.

8. A method as defined in claim 1, further comprising:
   associating a plurality of reference picture indices with a particular reference picture store using reference picture reordering commands; and
   assigning a zero weight to one of the plurality of reference picture indices and non-zero weights to the other reference picture indices.

9. A method for encoding a macroblock having at least one partition, the method comprising non-predictively intra-coding the at least one partition by providing a reference picture index that is associated with a weighting factor of zero, wherein said non-predictive intra-coding is performed within a weighted prediction encoding mode by using a weighting factor of zero with a weighted prediction tool from at least one of the Main and Extended profiles of the JVT standard.

10. A video encoder for mixed inter/intra encoding of a macroblock having a plurality of partitions, the encoder comprising:
    a reference picture weighting applicator; and
    a reference picture weighting factor unit in signal communication with the reference picture weighting applicator for assigning weighting factors corresponding to each of the mixed inter and intra coded partitions, respectively.

11. A video encoder as defined in claim 10, further comprising a motion compensation unit in signal communication with the reference picture weighting applicator for providing at least one each of a motion compensated inter and intra coded partition, respectively.

12. A video encoder as defined in claim 11, further comprising a reference picture store in signal communication with each of the reference picture weighting factor unit and the motion compensation unit for storing at least one each of a motion compensated inter and intra coded partition, respectively.

13. A video encoder as defined in claim 11 wherein the reference picture weighting applicator applies a weighting factor selected by the reference picture weighting factor unit to at least one of the motion compensated inter and intra coded partitions, respectively.

14. A video encoder as defined in claim 13 usable with bi-predictive picture predictors, the encoder further comprising prediction means for forming first and second predictors from the at least one weighted and motion compensated inter/intra coded partition.

15. A video encoder as defined in claim 10, further comprising:
    inter-coding means for inter-coding at least one partition of a macroblock; and
    intra-coding means for intra-coding at least a second partition of the macroblock.

16. A video encoder as defined in claim 15 wherein said macroblock comprises video data in compliance with the Joint Video Team ("JVT") standard.

17. A video encoder as defined in claim 15 wherein said macroblock comprises a non-intra macroblock type.

18. A video encoder as defined in claim 15 wherein said intra-coding means comprises indexing means for providing a reference picture index that is associated with a weighting factor of zero.

19. A video encoder as defined in claim 15, further comprising non-predictive intra-coding means for coding a zero differential motion vector for a partition that is non-predictively intra-coded.

20. A video encoder as defined in claim 15 wherein the inter-coded at least one of said plurality of partitions has a reference picture index associated with a non-zero valued weighting factor.

21. A video encoder as defined in claim 20, further comprising decision means for deciding between inter-coding and non-predictive intra-coding of a partition in response to a measure of cost for each coding method.

22. A video encoder as defined in claim 15, further comprising:
  reference picture reordering means for associating a plurality of reference picture indices with a particular reference picture store using reference picture reordering commands; and
  weighting means for assigning a zero weight to one of the plurality of reference picture indices and non-zero weights to at least one other reference picture index.

23. An apparatus for encoding a macroblock having a plurality of partitions comprising:
  means for inter-coding at least one of said plurality of partitions; and
  means for intra-coding at least a second of said plurality of partitions,
  wherein said means for intra-coding utilizes a reference picture index that is associated with a weighting factor of zero.

* * * * *